Figure 1:
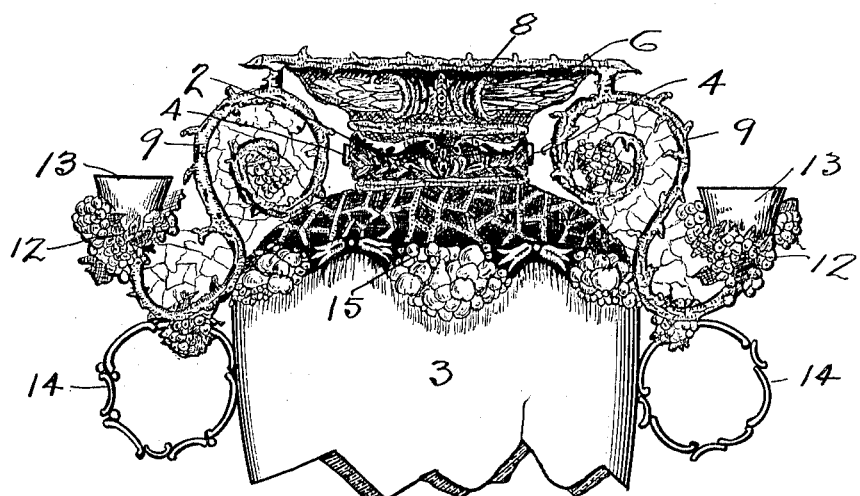

D. BLOOM.
SHOW JAR.
APPLICATION FILED FEB. 5, 1912.

1,096,992.

Patented May 19, 1914.
2 SHEETS—SHEET 1.

WITNESSES
W. G. Prest
H. A. Scholten

INVENTOR
DAVID BLOOM.
BY Miller & White
HIS ATTORNEYS

D. BLOOM.
SHOW JAR.
APPLICATION FILED FEB. 5, 1912.

1,096,992.

Patented May 19, 1914.
2 SHEETS—SHEET 2.

WITNESSES
H. G. Pirot.
H. A. Scholten.

INVENTOR
DAVID BLOOM
BY Miller & White
HIS ATTORNEYS

COLUMBIA PLANOGRAPH CO., WASHINGTON, D. C.

UNITED STATES PATENT OFFICE.

DAVID BLOOM, OF BERKELEY, CALIFORNIA.

SHOW-JAR.

1,096,992.  Specification of Letters Patent.  Patented May 19, 1914.

Application filed February 5, 1912. Serial No. 675,589.

*To all whom it may concern:*

Be it known that I, DAVID BLOOM, a citizen of the United States, and a resident of Berkeley, county of Alameda, and State of California, have invented certain new and useful Improvements in Show-Jars, of which the following is a specification.

The invention relates to show jars such as are used in stores, museums, exhibits and other places for preserving and exhibiting fruits, flowers and other articles in their natural condition.

The object of the invention is to provide an ornamental jar which will greatly enhance the beauty and attractiveness of the exhibit in general and the particular contents of the jar.

Another object of the invention is to provide means within the jar for holding and supporting the contents in an artistic manner.

A further object of the invention is to provide a top for such jars which is provided with a receptacle for holding fresh fruit or flowers of the same description as those within the jar, or bearing some relation thereto, and frames or holders for containing photographs or descriptive matter relating to the contents.

The invention possesses other advantageous features, which with the foregoing will be set forth at length in the following description, where I shall outline in full that form or embodiment of the invention which I have selected for illustration in the drawings accompanying and forming part of the present application.

The novelty of the invention will be included in the claims succeeding said description. From this it will be apparent that I do not restrict myself to the showing made by said drawings and description as I may adopt many variations within the scope of my invention as expressed in said claims.

Figure 2:
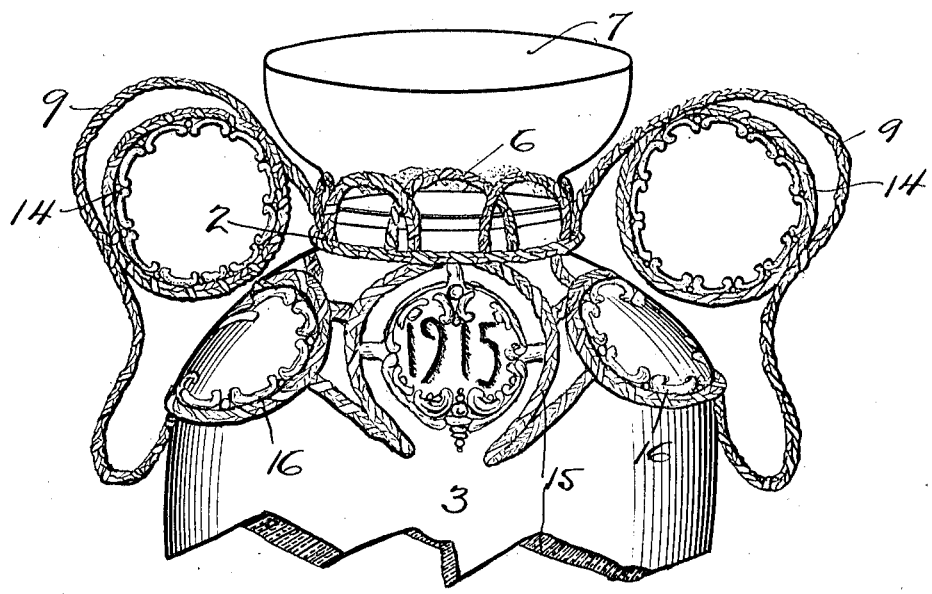
Figure 3:
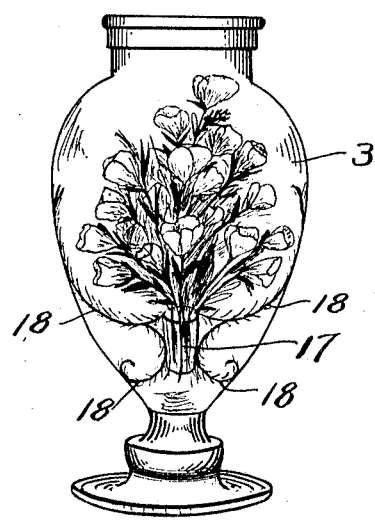
Figure 4:
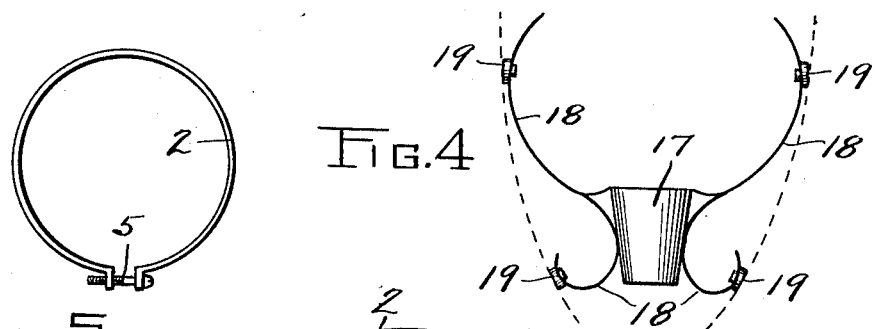
Figure 5:
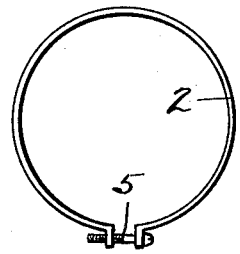
Figure 6:
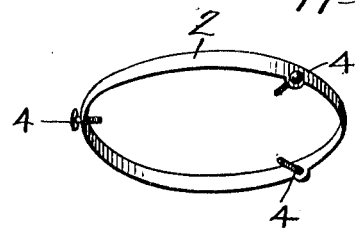

Referring to the drawings, Figure 1 is a view of the upper portion of a jar showing the top of my invention arranged thereon. Fig. 2 is a similar view showing a modified construction of the top. Fig. 3 is a view of a jar with the holder of my invention arranged therein; the ornamental top being omitted. Fig. 4 is a view of the holder of my invention. Fig. 5 is a view of the holding ring which is preferably used in connection with the construction shown in Fig. 2. Fig. 6 is a perspective view of the holding means which is preferably used in connection with the construction shown in Fig. 2.

At the present time, exhibit jars are generally plain in construction and no provision is made for enhancing the attractiveness of the jar or its contents. Further than this, labels bearing a description of the contents are generally pasted on the jar, which not only detract from its general appearance but also distract the attention of the observer from the contents. There is also no provision made for supporting the articles in the jar, other than by contact with the sides and bottom, a feature which is very detrimental to the exhibition of flowers or similar products.

The articles in the jars are preserved by immersing them in a solution and then closing the jar with a cover which is held in place by large clamps which greatly detract from the general appearance of the jar. In the present jar the cover is held to its seat by means of a vacuum within the jar, thereby presenting a flat top, free from all clamps, which lends itself readily to the application of the top of my invention.

The top consists preferably of a metallic structure having a band 2 which engages the neck of the jar 3 and which is held in place by means of the thumb screws 4 which bear against the neck or by a screw 5 which acts to contract the band and cause it to clamp the neck. Arranged on this band is a structure 6 projecting upward from the band and extending above the top of the jar, forming a seat for a receptacle 7 or when made with solid sides as shown at 8, forming the receptacle itself.

Attached to the band 2 or to the structure 6 are a plurality of outwardly extending arms 9 which are turned upward at their outer ends, at which points are arranged seats 12 for receptacles 13. The receptacles are filled with fruits or flowers of the same description or bearing a relation to the products within the jar and add greatly to the general attractiveness of the exhibit. Formed on the arms, also, are frames or receptacles 14 which contain photographs, printed matter or other matter relative to the contents. These frames are constructed so that the inserts may be readily changed, should it be desirable to place the top on a jar containing a different product. The top also includes a structure 15 which overlies the sides of the jar and which may also be formed to include frames 16 into which various subject matter may be inserted. The whole top structure is preferably made ornamental to conform to the contents of the jar. For instance, the top shown in Fig. 1 is particularly adapted to be applied to a jar containing grapes, since the general features of its construction are based on the character and appearance of grape vines. The receptacle 8, may be filled with fresh grapes of the same kind in season and the receptacles 13 may be filled with flowers of the same general color as the grapes. The frames 14 may also hold a photograph of the vineyard from which the grapes were taken and printed matter designating the locality the kind or other information.

When flowers are to be exhibited, some means should be employed for holding them upright in the jar so that they will be displayed to the best effect. For this purpose I have provided a holder 17 which is preferably cylindrical or conical in shape and which is preferably held in place in the jar by means of the arms 18. Small rubber disks 19 are attached to the arms at points where the arms would contact with the sides of the jar, to hold the holder firmly in position. These arms are preferably made resilient so that they press outwardly against the jar. The combination of a jar of flowers, in which the flowers are supported by the present holder, and a top provided with receptacles for holding the same species of flower, presents a very ornamental and highly attractive exhibit.

I claim:

1. An exhibit jar for the display of flowers or fruits comprising means arranged in the jar for supporting the contents and a structure mounted on top of the jar containing frames for the insertion of printed matter.

2. An exhibit jar for the display of fruits or flowers comprising means arranged within the jar for supporting the contents, a structure adapted to be secured to the top of the jar, arms on said structure, and receptacles adapted to contain material relevant to the contents of the jar arranged on said arms.

In testimony whereof, I have hereunto set my hand at San Francisco, California, this 30th day of January 1912.

DAVID BLOOM.

In presence of—
 H. G. PROST,
 R. HEFFERNAN.

---

Copies of this patent may be obtained for five cents each, by addressing the "Commissioner of Patents, Washington, D. C."